(12) United States Patent
Fleizach et al.

(10) Patent No.: US 12,015,824 B2
(45) Date of Patent: Jun. 18, 2024

(54) PASSIVE COHERENT LOCATION WITH A PREDICTION OF A BROADCAST SIGNAL

(71) Applicant: United States of America as represented by the Secretary of the Navy, San Diego, CA (US)

(72) Inventors: Gregory Knowles Fleizach, San Diego, CA (US); Nicholas T. Johnson, Pensacola, FL (US); Mohamed Chergui, San Diego, CA (US); Christopher Lichtenberg, Carlsbad, CA (US); Michael P. Civerolo, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 574 days.

(21) Appl. No.: 17/207,402

(22) Filed: Mar. 19, 2021

(65) Prior Publication Data

US 2022/0303622 A1 Sep. 22, 2022

(51) Int. Cl.
 *H04N 21/458* (2011.01)
 *G01S 1/00* (2006.01)
 (Continued)

(52) U.S. Cl.
 CPC ............ *H04N 21/458* (2013.01); *G01S 1/00* (2013.01); *G01S 13/003* (2013.01); *G01S 13/58* (2013.01);
 (Continued)

(58) Field of Classification Search
 CPC ......... G01S 13/003; G01S 13/58; G01S 13/86
 (Continued)

(56) References Cited

U.S. PATENT DOCUMENTS 6,703,968 B2 3/2004 Baugh
7,019,692 B2 3/2006 Baugh
(Continued)

FOREIGN PATENT DOCUMENTS

EP 1972962 A2 9/2008

OTHER PUBLICATIONS

Johnson et al. "Ambiguity Function Analysis for Passive Radar System Performance." Military Communications Conference, MILCOM 2016. IEEE.
(Continued)

*Primary Examiner* — Bo Fan
(74) *Attorney, Agent, or Firm* — Naval Information Warfare Center, Pacific; Kyle Eppele; Andrew Cameron

(57) ABSTRACT

An apparatus for passive coherent location includes a forecaster, an evaluator, a receiver, and a correlator. The forecaster generates a prediction of a radio-frequency signal transmitted from an antenna of a broadcasting service. The evaluator generates an effectiveness metric from the prediction of the radio-frequency signal. The receiver receives the radio-frequency signal that an object reflects from the antenna to the receiver. The correlator determines, from the
(Continued)

radio-frequency signal reflected from the object as received at the receiver, an ambiguity function having a maximum at a temporal offset and a Doppler shift. The temporal offset and the Doppler shift at the maximum partially determine at least a position of the object. The apparatus optionally includes a selector for tuning the receiver to the radio-frequency signal in response to the effectiveness metric.

17 Claims, 2 Drawing Sheets

(51) Int. Cl.
  *G01S 13/00*   (2006.01)
  *G01S 13/58*   (2006.01)
  *G01S 13/86*   (2006.01)
  *H04N 21/45*   (2011.01)
  *H04N 21/466*   (2011.01)
  *H04N 21/61*   (2011.01)

(52) U.S. Cl.
  CPC ........... *G01S 13/86* (2013.01); *H04N 21/466* (2013.01); *H04N 21/4524* (2013.01); *H04N 21/6125* (2013.01)

(58) Field of Classification Search
  USPC ................. 342/99, 454; 381/16; 701/532
  See application file for complete search history.

(56) References Cited

U.S. PATENT DOCUMENTS

| | | | |
|---|---|---|---|
| 7,782,256 B2 | 8/2010 | Smith | |
| 2010/0097266 A1 | 4/2010 | Johnson | |
| 2010/0268459 A1* | 10/2010 | O'Shea | G01C 21/26 |
| | | | 701/532 |
| 2011/0112988 A1* | 5/2011 | Baker | H04H 20/72 |
| | | | 381/16 |
| 2013/0050024 A1* | 2/2013 | Barott | G01S 13/003 |
| | | | 342/454 |
| 2017/0254893 A1* | 9/2017 | Evans | G01S 13/723 |

OTHER PUBLICATIONS

"Acoustic Fingerprint." Wikipedia. <http://en.wikipedia.org/wiki/Acoustic_fingerprint>, retrived from Internet on Mar. 19, 2021.

* cited by examiner

PASSIVE COHERENT LOCATION WITH A PREDICTION OF A BROADCAST SIGNAL

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 106062.

BACKGROUND OF THE INVENTION

Passive coherent location uses non-cooperative signals of opportunity for object detection. These signals typically include FM radio, digital TV (DTV), and/or other commercial transmitters. Passive coherent location needs to receive both the direct path signal (i.e. from transmitter to receiver) and the reflected path signal (i.e. transmitter to object to receiver). However, the achievable accuracy of passive coherent location depends on the characteristics of the non-cooperative signals of opportunity. In addition, noise generated during transmission, atmospheric propagation, and reception degrades the achievable accuracy of passive coherent location.

SUMMARY

An apparatus for passive coherent location includes a forecaster, an evaluator, a receiver, and a correlator. The forecaster generates a prediction of a radio-frequency signal transmitted from an antenna of a broadcasting service. The evaluator generates an effectiveness metric from the prediction of the radio-frequency signal. The receiver receives the radio-frequency signal that an object reflects from the antenna to the receiver. The correlator determines, from the radio-frequency signal reflected from the object as received at the receiver, an ambiguity function having a maximum at a temporal offset and a Doppler shift. The temporal offset and the Doppler shift at the maximum partially determine at least a position of the object. The apparatus optionally includes a selector for tuning the receiver to the radio-frequency signal in response to the effectiveness metric.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other systems and methods described herein as will be understood by one of ordinary skill in the art unless otherwise stated specifically.

Disclosed is passive coherent location that predicts a priori the non-cooperative radio-frequency signals of opportunity. The prediction of each radio-frequency signal of opportunity enables extracting the characteristics that determine the achievable accuracy from passive coherent location using that radio-frequency signal. The passive coherent location selects the particular radio-frequency signal providing the highest accuracy. The prediction of each radio-frequency signal of opportunity also enables eliminating certain noise sources, which improves sensitivity, as discussed below. Thus, a priori known content improves passive coherent location, and eliminates blindly relying on whatever radio-frequency signals happen to be broadcast.

Figure 1:
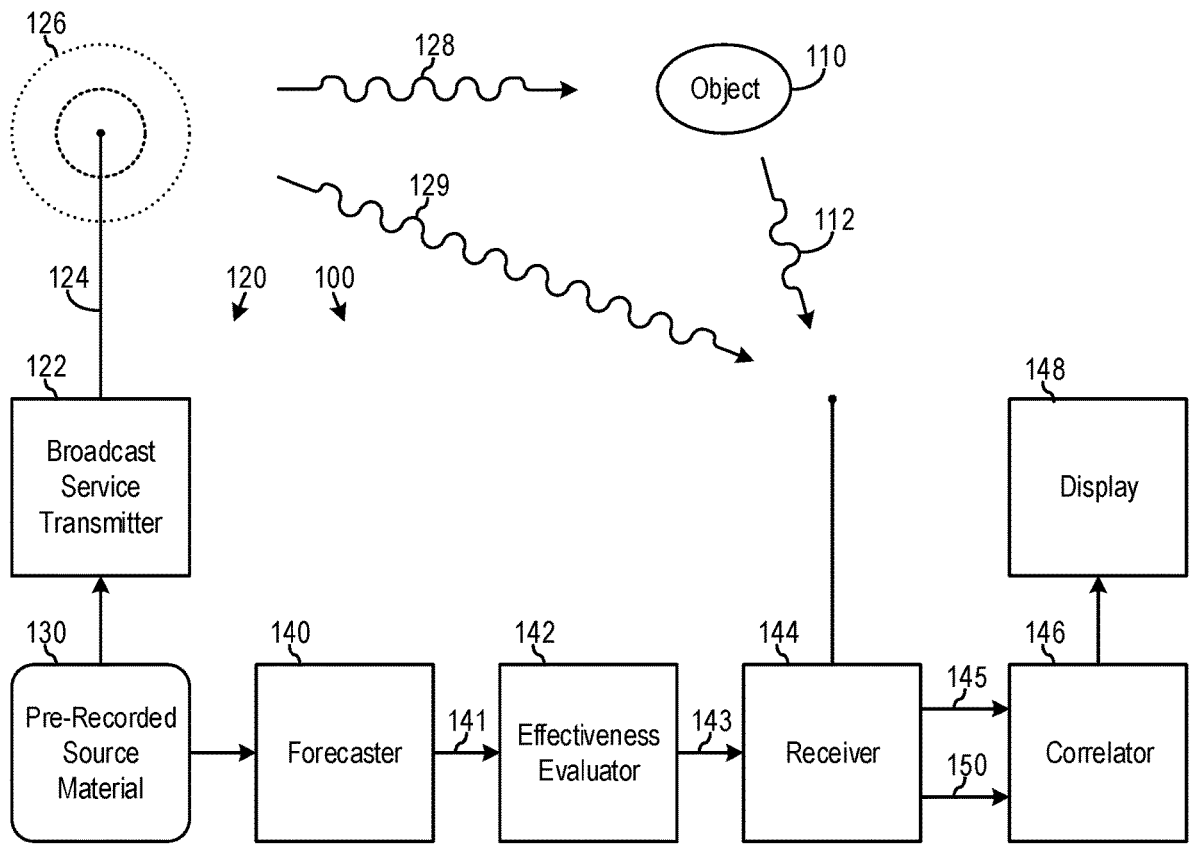
FIG. 1 is a block diagram of an apparatus for passive coherent location of an object in accordance with an embodiment of the invention.

FIG. 1 is a block diagram of an apparatus 100 for passive coherent location of an object 110 in accordance with an embodiment of the invention. The apparatus 100 determines the position and velocity of object 110 using a radio-frequency signal 126 transmitted from an antenna 124 and reflected from object 110 to the receiver 144 of the apparatus 100 for passive coherent location.

Because the indirect path from the antenna 124 to the object 110 and then to the receiver 144 is longer than the direct path from the antenna 124 to the receiver 144, the propagation time for the radio-frequency signal 126 differs between the indirect and direct paths. Together with the speed of light, the time difference of arrival (TDOA) at receiver 144 measures the distance that the indirect path via the object 110 is longer than the direct path. Thus, this measured TDOA partially determines the position of the object 110, and this measured TDOA and additional measurements fully determine the position of the object 110, as discussed below.

Similarly, relative movement among the antenna 124, the object 110, and the receiver 144 produces Doppler shifts in the frequency of the radio-frequency signal 126, which Doppler shifts are collectively measured as a frequency difference of arrival (FDOA) between the indirect path and the direct path. This measured FDOA partially determines the velocity of the object 110.

A broadcasting service 120, such as a radio station or a television station, has a transmitter 122 that transmits a radio-frequency signal 126 from an antenna 124 of the broadcasting service 120. The radio-frequency signal 126 transmitted from antenna 124 includes the radio-frequency signal 128 transmitted from antenna 124 toward object 110, and, in the embodiment illustrated in FIG. 1, includes the radio-frequency signal 129 transmitted from antenna 124 directly to the apparatus 100 for passive coherent location.

Typically, the broadcasting service 120 broadcasts pre-recorded source material 130. Even a so-called "live" broadcast usually records a several second delay in non-transitory storage of pre-recorded source material 130 so that the broadcasting service 120 can interrupt the "live" broadcast to prevent broadcasting material prohibited under regulatory requirements for public broadcasting.

Often, the pre-recorded source material 130 is publicly available in advance or concurrent with broadcasting the pre-recorded source material 130 in the radio-frequency signal 126. In one example, the broadcasting service 120 broadcasts the pre-recorded source material 130 in multiple time zones at the same local time in each time zone, so that the pre-recorded source material 130 is available an hour or more in advance for the later time zones. In another example, the broadcasting service 120 concurrently broadcasts the same pre-recorded source material 130 in the radio-frequency signal 126 and in a digital internet stream.

The apparatus 100 for passive coherent location includes a forecaster 140, an effectiveness evaluator 142, and a receiver 144. The forecaster 140 generates a prediction on line 141 of a radio-frequency signal 126 transmitted from an antenna 124 of a broadcasting service 120. The forecaster 140 generates the prediction from the pre-recorded source material 130. The evaluator 142 generates an effectiveness metric on line 143 from the prediction on line 141 of the radio-frequency signal 126. The effectiveness metric specifies a limit on an achievable accuracy of the passive coherent location using the radio-frequency signal 126 transmitted from an antenna 124. This limit on the achievable accuracy is degraded by various factors, such as received noise and multipath interference. An object 110 reflects the radio-frequency signal 128 from the antenna 124 toward the receiver 144 as a radio-frequency signal 112. The receiver 144 receives the radio-frequency signal 112 that the object 110 reflects from the antenna 124 to the receiver 144. On indirect line 145, the receiver 144 forwards the radio-frequency signal 112 as received to a correlator 146. In the embodiment of FIG. 1, the receiver 144 also receives the radio-frequency signal 129 directly from the antenna 124 and, on direct line 150, forwards the radio-frequency signal 129 as received to the correlator 146.

The apparatus 100 for passive coherent location further includes the correlator 146 and a display 148. The correlator 146 determines, from the radio-frequency signal 112 reflected from the object 110 as received at the receiver on indirect line 145, an ambiguity function having a maximum at a temporal offset and a Doppler shift. In one embodiment, the correlator 146 determines the ambiguity function from a correlation between the indirectly received radio-frequency signal on line 145 and the directly received radio-frequency signal on line 150, at a sampling of various possible temporal offsets and Doppler shifts. The ambiguity function typically has a well-defined peak at particular time/frequency index, and the temporal offset and the Doppler shift of this particular index at the maximum of the ambiguity function gives the most likely combination (i.e. maximum likelihood) of temporal offset and Doppler shift. The sharpness of the peak's maximum also provides a confidence metric for this temporal offset and Doppler shift.

In one embodiment, in response to the effectiveness metric on line 143 from evaluator 142, the receiver 144 receives the radio-frequency signal 112 that an object 110 reflects from the antenna 124 to the receiver 144. For example, the receiver 144 receives the radio-frequency signal 112 when the effectiveness metric indicates that the radio-frequency signal 126 transmitted from an antenna 124 might provide a sufficient achievable accuracy for the passive coherent location. Otherwise, when the limit on the achievable accuracy is insufficient, the passive coherent location of apparatus 100 is suspended, and active radar location is initiated instead.

Because the radio-frequency signal 112 reflected from the object 110 is typically much weaker than the directly received radio-frequency signal 129, but the correlator 146 preferably processes indirectly and directly received radio-frequency signals of comparable strength, the receiver 144, in some embodiments, includes separate circuitry and a separate antenna for the indirect and direct signal paths as discussed below.

The most likely combination of temporal offset and the Doppler shift at the maximum of the ambiguity function partially determine a position and a velocity of the object 110. The display 148 displays the most likely combination of temporal offset and Doppler shift, and/or the position and velocity of object 110 calculated from this temporal offset, this Doppler shift, and additional measurements as discussed below.

Figure 2:
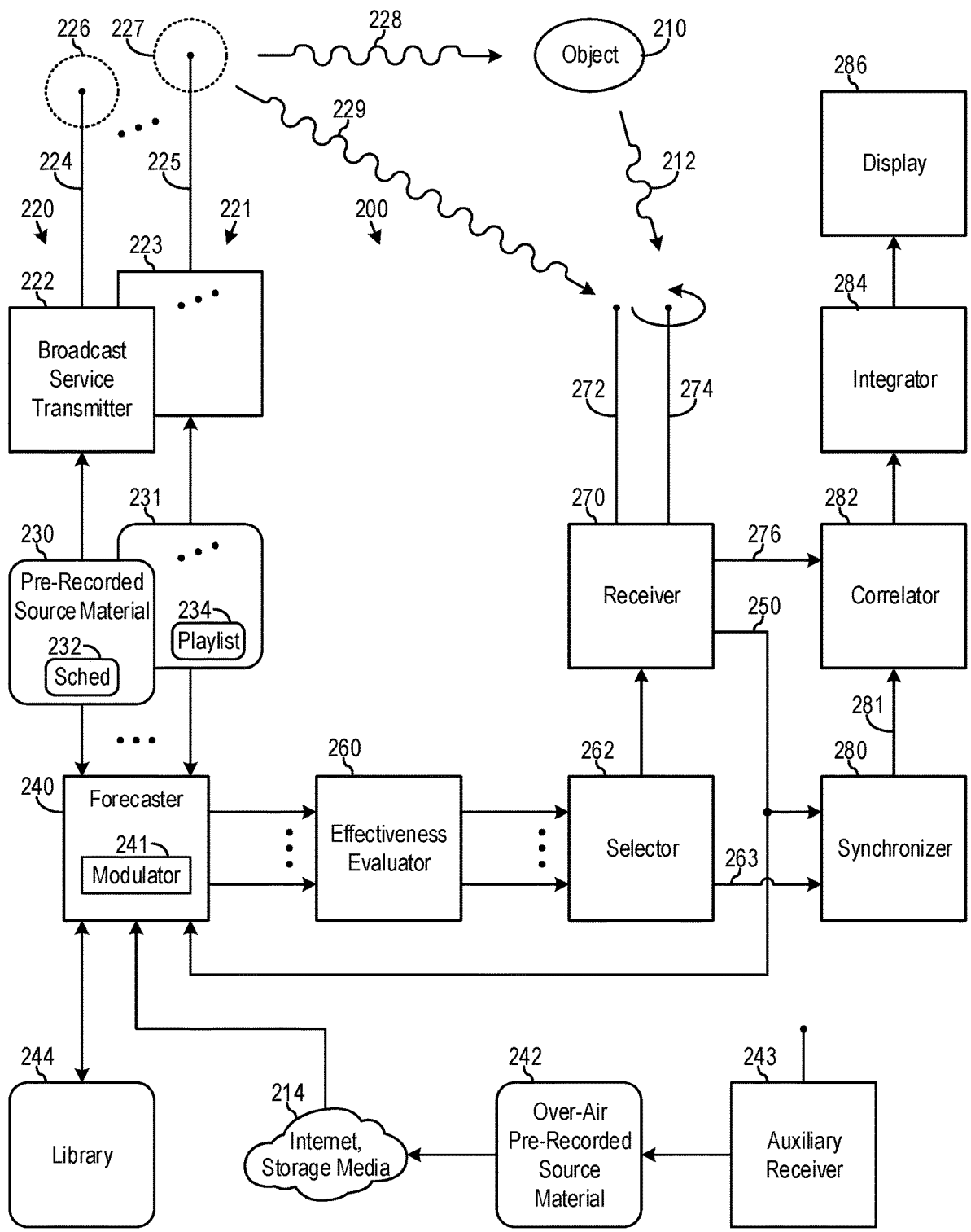
FIG. 2 is a block diagram of an apparatus for passive coherent location of an object in accordance with an embodiment of the invention.

FIG. 2 is a block diagram of an apparatus 200 for passive coherent location of an object 210 in accordance with an embodiment of the invention.

Transmitters 222 through 223 of multiple broadcasting services 220 through 221 broadcast radio-frequency signals 226 through 227 from respective antennas 224 through 225. The radio-frequency signals 226 through 227 broadcast pre-recorded source material 230 through 231.

The forecaster 240 generates a respective prediction of each of the radio-frequency signals 226 through 227 transmitted from respective antennas 224 through 225 of respective broadcasting services 220 through 221. How the forecaster 240 generates the respective prediction of each radio-frequency signal 226 through 227 depends upon the manner in which the forecaster 240 gains access to the pre-recorded source material 230 through 231.

In one embodiment, broadcasting service 220 publishes a schedule 232 of pre-recorded segments. For example, television networks publish a schedule 232 of television shows broadcast from each transmitter 222 associated with the television network. The schedule 232 is usually published at least a month in advance to enable printed publication in "TV Guide" and publication in similar on-line guides. The vast majority of scheduled television shows are "reruns," which are television shows previously broadcast. Such "reruns" are generally available from an internet streaming service of the television network or from other internet streaming services. Thus, the forecaster 240 can obtain most of the pre-recorded segments in the published schedule 232 well in advance from the internet 214, and then the forecaster 240 generates the prediction that assembles the pre-recorded segments obtained in advance according to the schedule 232.

Certain scheduled television shows, such as new episodes of a television series or "live" broadcasts of news programs and sporting events, are not available in advance from streaming services. However, a new episode of a television series can still be available hours in advance when the new episode is scheduled to broadcast at successive times in various time zones, even if the new episode has delayed availability from internet streaming services. Thus, in one embodiment, the forecaster 240 can generate the prediction of the broadcast of a new episode of a television series in a later time zone from over-air pre-recorded source material 242 received at auxiliary receiver 243 disposed in an earlier time zone. Typically, the auxiliary receiver 243 down converts to a baseband and then digitizes the over-air pre-recorded source material 242 for transport over the internet 214 to the forecaster 240.

Note that if the auxiliary receiver 243 receives a digital radio broadcast or digital television broadcast, then the error correction generally included in such a digital broadcast enables the over-air pre-recorded source material 242 to be an exact duplicate of the pre-recorded source material 230.

New episodes of a television series might not be available in advance for the earliest time zone in which they are broadcast. "Live" broadcasts of news programs and sporting events might also not be available in advance. However, these broadcast might be available over the internet 214 from a streaming service that concurrently broadcasts a digital internet stream corresponding to the radio-frequency signal 226 transmitted from the antenna 224. For example, "iHeartRadio" concurrently broadcasts over the internet 214 digital streams that correspond with many frequency modulation (FM) radio stations. In one embodiment, the forecaster 240 generates the prediction of the broadcast of the radio-frequency signal 226 from the concurrent digital internet stream of the broadcasting service 220. This way of generating the prediction might be less preferable because the prediction might not be available in advance depending upon various factors, including buffering in the internet 214.

In one embodiment, the broadcasting service 221 is a radio or television station that broadcasts pre-recorded segments from a playlist 234. For example, the radio-frequency signal 227 broadcasts musical compositions selected from the playlist 234 of the pre-recorded source material 231 of a radio broadcasting service 221. More generally, the pre-recorded segments in the playlist 234 include musical compositions, commercials, podcasts, or television programs. The playlist 234 might or might not be published.

In this embodiment, the forecaster 240 generates an identifier of the pre-recorded segment that transmitter 223 is currently broadcasting from antenna 225. As discussed further below, the radio-frequency signal 229 received directly from the antenna 225 is forwarded to the forecaster 240 on direct line 250. The forwarded radio-frequency signal 229 on direct line 250 might include data of a Radio Data Service (RDS) that specifies information including the artist and track name of a song currently being broadcast from antenna 225, and the artist and track name might become available from the RDS just before the song begins playing. From the information on direct line 250, the forecaster 240 generates the identifier of the artist and track name, and the forecaster 240 uses this identifier to retrieve the song on-the-fly from Google Play, iTunes, or a similar internet service on the internet 214, or from storage media such as a CD or DVD. The forecaster 240 generates the prediction of the radio-frequency signal 227 from the retrieved song currently being played.

Alternatively, such as when RDS is not available during commercials, the forecaster 240 generates an identifier, which is a spectral signature of the current one of the pre-recorded segments broadcast in the radio-frequency signal 227 forwarded on direct line 250. In one embodiment, the spectral signature is an acoustic fingerprint, which is a deterministically generated digital summary of an audio signal. The fingerprint contains condensed information useful for identifying audio signals quickly and uniquely in a database. Instead of dealing with the entire audio signal, the data is reduced substantially while retaining the pertinent identifying content of the audio.

In one embodiment having an FM broadcast for the radio-frequency signal 227, after the demodulation to baseband and then digitization, the baseband of the FM broadcast is demodulated to extract its audio content. This includes FM demodulation, low-pass filtering of the left plus right channel, shifting the left minus right channel to baseband and low-pass filtering, and then combining the two channels to create the left and right channels. The next step is to generate the acoustic fingerprint of the audio, which can be used to uniquely determine the audio content. For example, the acoustic fingerprint condenses the relatively high rate audio (~44 kHz) down to a lower sample rate (e.g. tens of samples per second) based on the most prominent spectral features and their time relation to one another.

For example, a spectral signature includes taking an average spectrum over an entire song. This is based on the observation that within a specific audio recording (e.g. with the same speaker/singer, instruments, synthesizers, etc.) there are a number of recognizable spectral components that repeat throughout the recording. A variation would isolate only the largest spectral components across a given time snippet prior to averaging. This could be accomplished by applying a non-maximal suppression (NMS) filter to a spectrogram (i.e. time vs. frequency vs. amplitude) of the audio recording and averaging the filter outputs. This method of averaging across time removes the time dependence for the spectral components detected, which could make the lookup process simpler.

The spectral signature is generated on numerous examples of audio content in advance and then spectral signature is generated on an audio snippet that is currently received. The spectral signature of the snippet is matched to a spectral signature stored in the lookup table (LUT). That is, the spectral signature of the snippet is used to index into the LUT to identify the audio content that is currently being broadcast. The ability to identify audio content uniquely is related to how many spectral signatures are stored in the LUT. Depending on which FM transmitters would be utilized, the library could be quite small (e.g. top 40 stations) or quite large (millions of audio files). A library containing the top 40 hits, however, would have to be continuously updated as popular songs changed, but the library would likely not have to grow very large as older songs become rarely played.

Fast matching between the spectral signature of the audio snippet of the current broadcast signal and an entry in the LUT is achieved when the LUT is a hash table. All or some of the spectral signature is hashed into a single value that indexes into LUT. This can drastically reduce the search space and produce a more thorough matching of the spectral signatures.

Each time the forecaster 240 generates an identifier of the pre-recorded segment that transmitter 223 is currently broadcasting from antenna 225, the forecaster 240 first checks whether the pre-recorded segment is already available in the library 244. If the pre-recorded segment is available in the library 244, then the forecaster 240 retrieves the pre-recorded segment from the library 244. Otherwise, the forecaster 240 retrieves the pre-recorded segment from the internet 214, and the forecaster 240 adds the pre-recorded segment to an entry in the library 244 together with the identifier so that when the pre-recorded segment is played again, the forecaster 240 can retrieve the pre-recorded segment from the entry of the library 244 without accessing the internet 214.

In summary, the forecaster 240 generates the prediction that assembles the pre-recorded segments each obtained from an entry in the library 244 when the identifier of a pre-recorded segment indicates the currently broadcast pre-recorded segment is already available in the library 244 for the broadcasting service 221. Otherwise, the current pre-recorded segment is obtained on-the-fly, and an entry in the library 244 is filled with the current pre-recorded segment, so that the library 244 evolves to encompass the playlist 234 for the broadcasting service 221. Library 244 evolves to encompass the playlist 234 even if the broadcasting service 221 does not publish the playlist 234 and the broadcasting service 221 continually adds new songs and commercials to the playlist 234 and deletes old songs and commercials from the playlist 234.

In one embodiment, the forecaster 240 implements multiple techniques for generating the predictions of the radio-frequency signals 226 through 227. The prediction techniques employed depend upon the available radio-frequency signals 226 through 227 of opportunity. When multiple prediction techniques are possible for a particular radio-frequency signal, the actual prediction technique is selected from a hierarchy that reflects the expected lead-time for producing the prediction and the expected lifespan of the produced prediction.

For example, when the broadcasting service 220 publishes a schedule 232 for the radio-frequency signal 226 transmitted from the antenna 224, the forecaster 240 generates the respective prediction that assembles a plurality of pre-recorded segments obtained in advance according to the schedule 232. Otherwise, when the broadcasting service 221 does not publish a schedule but does exhibit a playlist 234 for the radio-frequency signal 227 transmitted from the antenna 225, the forecaster 240 generates the respective prediction that assembles pre-recorded segments from a library 244, which has its entries filled on-the-fly with the pre-recorded segments, so that the library 244 evolves to encompass the playlist 234 for the broadcasting service 221. Otherwise, when the broadcasting service neither publishes a schedule nor exhibits a hidden playlist but the broadcasting service concurrently broadcasts a digital internet stream corresponding to the radio-frequency signal transmitted from the antenna, forecaster 240 generates the respective prediction from the digital internet stream. As a fallback when the forecaster 240 cannot generate the prediction using any of these techniques, passive coherent location is suspended and active radar location is initiated. Passive coherent location begins again when a predictable and effective radio-frequency signal becomes available.

The effectiveness evaluator 260 generates a respective effectiveness metric from the prediction of each of the radio-frequency signals 226 through 227. The inventors have discovered that when the forecaster 240 predicts the radio-frequency signals 226 through 227, accuracy of the calculated position of the object 210 is improved when the most effective one of the radio-frequency signals 226 through 227 is used for passive coherent location. The respective effectiveness metrics provide an achievable accuracy for passive coherent location with each of the radio-frequency signals 226 through 227.

The temporal measurement accuracy achievable for measuring the arrival time of a radio-frequency signal is roughly the inverse of the bandwidth of the radio-frequency signal. Because the radio-frequency signals 226 through 227 generally have dynamically different bandwidths, their temporal measurement accuracy varies dynamically. In an extreme example, an analog FM radio station continuously broadcasting a single musical tone on both stereo channels has zero bandwidth and hence provides no temporal measurement accuracy; the time difference of arrival (TDOA) between the indirect and direct paths cannot be determined because innumerable relative temporal shifts appear identical during correlation. In contrast, the continuous musical tone provides excellent measurement accuracy for Doppler shift; the changing pitch of the single musical tone as received unambiguously indicates the Doppler shift.

The actual signal bandwidth of a broadcast signal varies based on the modulation content. For example, jazz and rock music have wider bandwidths than plain speech. A typical FM radio station, however, switches from music to the speech of the host and then to a commercial, all of which will have different signal bandwidths. Moreover, the signal bandwidth can change significantly just within the course a single musical composition. Because passive coherent location relies on third-party transmitters of opportunity, the ability to accurately resolve time and frequency from the ambiguity function (and hence the range and speed of the object) will fluctuate.

The effectiveness evaluator 260 generates the effectiveness metric that reflects the achievable accuracy for measuring the time difference of arrival (TDOA) and the frequency difference of arrival (FDOA) between the indirect and direct paths. In one embodiment, the effectiveness evaluator 260 generates metrics determined from an auto-ambiguity function (aka ambiguity surface) of the prediction from the forecaster 240 for each of the radio-frequency signals 226 through 227. From the resulting ambiguity surface of the auto-ambiguity function, metrics such as range resolution, Doppler resolution, peak-to-sidelobe ratio (PSLR), and integrated sidelobe ratio (ISLR) are computed. These metrics indicate the ability of a particular radio-frequency signal to resolve a target response in both range and Doppler dimensions. PSLR indicates ability to resolve objects with various amplitude responses in the same range bin and ISLR indicates ability to resolve multiple objects in the same range bin.

The effectiveness evaluator 260 assigns the effectiveness metric a null value during each time interval in which the forecaster 240 cannot successfully generate the prediction of a radio-frequency signal. For example, the broadcasting service 221 broadcasts songs selected from the playlist 234 and the forecaster 240 cannot immediately generate the appropriate identifier and retrieve the song from the library 244, such that the prediction is invalid during this retrieval delay at the beginning of each song.

The selector 262 selects one of the radio-frequency signals 226 through 227 currently having a higher value of the respective effectiveness metric. The selector 262 typically selects the radio-frequency signal having the highest value of the respective effectiveness metric. However, selection of a radio-frequency signal might involve additional considerations. For example, when the object 210 is disposed between the receiver 270 and the antenna broadcasting a particular radio-frequency signal, approximately along the same line-of-sight, the resulting small time difference of arrival (TDOA) leaves much ambiguity in the position of the object 210 along the line-of-sight. Alternatively, such additional considerations are included in the effectiveness metric for such a badly disposed antenna. The selector 262 tunes the receiver 270 to the selected one of the radio-frequency signals 226 through 227, typically tuning the receiver 270 to the carrier frequency of the selected radio-frequency signal. The selector 262 forwards on line 263 the prediction generated by the forecaster 240 and selected by the selector 262 based on the effectiveness metrics from the effectiveness evaluator 260.

In the embodiment of FIG. 2, the receiver 270 includes an omnidirectional antenna 272 for receiving the selected radio-frequency signal 229 directly from the antenna 225. The receiver 270 forwards the selected radio-frequency signal 229 received directly from the antenna 225 on direct line 250 to both the forecaster 240 and the synchronizer 280. The receiver 270 also includes a rotating antenna 274 that is a scanning narrow-beam antenna, which provides a bearing to the position of the object 210 when the scanning narrow-beam antenna is directed toward the object 210 upon receiving the radio-frequency signal 212 when the object 210 reflects the radio-frequency signal 228 from the antenna 225 of the broadcasting service 221 to the receiver 270. The rotating antenna 274 is the antenna of an active radar that transmits and receives radar pulses. However, during an operating mode for passive coherent location, no radar pulses are transmitted, and instead the most effective of radio-frequency signals 226 through 227 are used for passive coherent location. The position of the object 210 is fully determined from the bearing from the rotating antenna 274 and a range calculated from the measured time difference of arrival (TDOA).

In one embodiment, the receiver 270 extracts a received baseband signal from the selected and tuned radio-frequency signal 212. This received baseband signal is a frequency down conversion, such as a heterodyne down conversion, of the radio-frequency signal 212 that the object 210 reflects from the antenna 225 to the receiver 270. Typically, after analog down conversion to the baseband or an intermediate frequency, analog-to-digital conversion prepares the received signal for digital signal processing. The receiver 270 provides the received baseband signal on indirect line 276 to the correlator 282. In correspondence, the forecaster 240 generates the prediction of a transmitted baseband signal from a modulation by modulator 241 of a pre-recorded material 230 through 231. For example, the modulator 241 encodes the left plus right and the left minus right modulation of stereo channels in the baseband signal of an analog FM radio station. For another example, the modulator 241 encodes the main channel and any sub-channels in the digital modulation of a digital radio station or a digital television station. The prediction of the transmitted baseband signal is forwarded on line 281 to the correlator 282 via the effectiveness evaluator 260, the selector 262, and the synchronizer 280.

The synchronizer 280 synchronizes the prediction on line 263 of the radio-frequency signal 227 selected and tuned by the selector 262 with the selected radio-frequency signal 229 received directly from the antenna 225. The synchronizer 280 synchronizes so that the prediction forwarded on line 281 is temporally synchronized with the selected radio-frequency signal 229 as directly received at the receiver on direct line 250. In one embodiment, the synchronizer 280 correlates the prediction on line 263 from selector 262 with the selected received radio-frequency signal 229 as received on direct line 250. When the broadcasting service 220 with schedule 232 is selected and tuned, the synchronizer 280 synchronizes the prediction, which on line 263 assembles the pre-recorded segments according to the schedule 232, with the radio-frequency signal 226 received directly from the antenna 224. When the broadcasting service 221 with playlist 234 is selected and tuned, the synchronizer 280 synchronizes the prediction, which on line 263 assembles pre-recorded segments from the playlist 234, with the radio-frequency signal 227 received directly from the antenna 225.

After the synchronizer 280 achieves synchronization, passive coherent location continues despite the receiver 270 temporarily losing the selected radio-frequency signal 229 as directly received at the receiver on direct line 250, such as when an obstruction of mountainous terrain blocks the direct path of the radio-frequency signal 229, but does not block the indirect path of the radio-frequency signals 228 and 212. Thus, the inventors have discovered that predicting the radio-frequency signals 226 through 227 allows passive coherent location to continue successfully despite temporary loss of the direct path of the selected radio-frequency signal 229.

The correlator 282 determines an ambiguity function from the radio-frequency signal 212 reflected from the object 210 as received at the receiver 270. In the embodiment of FIG. 2, the correlator 282 determines the ambiguity function from both the prediction on line 263 as synchronized by the synchronizer 280 and then forwarded on line 281, and the radio-frequency signal 212 reflected from the object 210 as received at the receiver 270. In one embodiment, the correlator 282 determines the ambiguity function from both the forwarded prediction of the transmitted baseband signal on line 281 and the received baseband signal on indirect line 276.

The inventors have discovered not only does the prediction of the radio-frequency signals 226 through 227 enable selecting the most effective one of the radio-frequency signals 226 through 227 for passive coherent location, but also accuracy is further improved when correlator 282 uses the forwarded prediction on line 281 of the selected radio-frequency signal. This is because the forwarded prediction on line 281 is usually a noise-free reference for the appropriate pre-recorded source material 230 through 231. In contrast, when a correlator instead uses the selected radio-frequency signal as directly received (as in FIG. 1 with correlator 146 using the radio-frequency signal 129 as directly received at the receiver on line 150) noise generated during transmission, atmospheric propagation, and reception degrades the achievable accuracy of passive coherent location.

Furthermore, the direct path signal is often received with a much higher power than the reflected path because the reflected path has a longer length than the direct path and because the radio-frequency signal is attenuated upon reflection from the object 210 and further attenuated after the reflection from an additional spreading loss. A correlator has difficulty extracting the weak reflected path from noise when the power of the direct path signal is many orders of magnitude larger than the reflected path. Instead of the radio-frequency signal on direct line 250, the correlator 282 uses a noise-free reference on line 281 for the appropriate pre-recorded source material 230 through 231, so that correlator 282 more sensitively extracts the received radio-frequency signal on indirect line 276 from noise, even when the received radio-frequency signal on indirect line 276 is weak at or below the noise floor.

The ambiguity function of correlator 282 has a maximum at a temporal offset and a Doppler shift. The temporal offset and the Doppler shift at the maximum partially determine a position and a velocity of the object 210. In an embodiment with a rotating narrow-beam antenna 274 that provides a bearing to the position of the object 210, the temporal offset at the maximum and the bearing together determine a range of the position of the object 210, the bearing and the range fully determining the position of the object 210, and the Doppler shift partially specifies a velocity of the object 210.

Integrator 284 averages the position and velocity calculated from the measured temporal offset and Doppler shift of object 210. In one embodiment, integrator 284 is a Kalman filter that models physical characteristics, such as the inertia of a moving object 210. In another embodiment for a stationary object 210, integrator 284 calculates a weighted average of position and velocity recently calculated, with the weights including the effectiveness metric for the selected radio-frequency signal from the evaluator 260 and the sharpness of the maximum the ambiguity function from the correlator 282. The display 286 displays the averaged position and velocity of object 210.

From the above description of Passive Coherent Location with a Prediction of a Broadcast Signal, it is manifest that various techniques may be used for implementing the concepts of systems 100 and 200 without departing from the scope of the claims. The described embodiments are to be considered in all respects as illustrative and not restrictive. The apparatus/method disclosed herein may be practiced in the absence of any element that is not specifically claimed and/or disclosed herein. It should also be understood that each of systems 100 and 200 is not limited to the particular embodiments described herein, but is capable of many embodiments without departing from the scope of the claims.

We claim:

1. An apparatus for passive coherent location comprising:
a forecaster for generating a prediction, based on a plurality of pre-recorded segments, of a radio-frequency signal transmitted from an antenna of a broadcasting service;
an evaluator for generating an effectiveness metric from the prediction of the radio-frequency signal;
a receiver for receiving the radio-frequency signal that an object reflects from the antenna to the receiver; and
a correlator for determining, from the prediction and the radio-frequency signal reflected from the object as received at the receiver, an ambiguity function having a maximum at a temporal offset and a Doppler shift, wherein the temporal offset and the Doppler shift at the maximum partially determine at least a position of the object, wherein
the receiver includes a scanning narrow-beam antenna for providing a bearing to the position of the object when the scanning narrow-beam antenna is directed toward the object upon receiving the radio-frequency signal that the object reflects from the antenna of the broadcasting service to the receiver; and
the correlator is for determining the ambiguity function having the maximum at the temporal offset and the Doppler shift, wherein the temporal offset at the maximum and the bearing together determine a range of the position of the object, the bearing and the range fully determining the position of the object, and the Doppler shift partially specifies a velocity of the object.

2. The apparatus of claim 1, further comprising a selector for tuning the receiver to the radio-frequency signal in response to the effectiveness metric.

3. An apparatus for passive coherent location comprising:
a forecaster for generating a prediction, based on a plurality of pre-recorded segments, of a radio-frequency signal transmitted from an antenna of a broadcasting service;
an evaluator for generating an effectiveness metric from the prediction of the radio-frequency signal;
a receiver for receiving the radio-frequency signal that an object reflects from the antenna to the receiver; and
a correlator for determining, from the prediction and the radio-frequency signal reflected from the object as received at the receiver, an ambiguity function having a maximum at a temporal offset and a Doppler shift, wherein the temporal offset and the Doppler shift at the maximum partially determine at least a position of the object, wherein the radio-frequency signal is included in a plurality of radio-frequency signals, which each are transmitted from a respective antenna of a respective broadcasting service, the apparatus comprising:
the forecaster for generating a respective prediction of each of the radio-frequency signals transmitted from the respective antenna of the respective broadcasting service;
the evaluator for generating a respective effectiveness metric from the respective prediction of each one of the radio-frequency signals;
a selector for tuning the receiver to a current one of the radio-frequency signals having a higher value of the respective effectiveness metric;
the receiver for receiving the current one of the radio-frequency signals that the object reflects from the respective antenna to the receiver; and
the correlator for determining, from the current one of the radio-frequency signals reflected from the object as received at the receiver, the ambiguity function having the maximum at the temporal offset and the Doppler shift, wherein the temporal offset and the Doppler shift at the maximum partially determine the position of the object.

4. The apparatus of claim 1, wherein:
the receiver is further for receiving the radio-frequency signal directly from the antenna; and
the correlator is for determining the ambiguity function from both the radio-frequency signal received at the receiver directly from the antenna and the radio-frequency signal reflected from the object as received at the receiver.

5. The apparatus of claim 1, wherein the correlator is for determining the ambiguity function from both the prediction of the radio-frequency signal and the radio-frequency signal reflected from the object as received at the receiver.

6. The apparatus of claim 1, wherein the forecaster is for generating the prediction from a digital internet stream of the broadcasting service, which concurrently broadcasts the digital internet stream corresponding to the radio-frequency signal transmitted from the antenna.

7. The apparatus of claim 1, wherein the forecaster is further for obtaining in advance the plurality of pre-recorded segments in a schedule that the broadcasting service publishes, and the forecaster is for generating the prediction that assembles the pre-recorded segments obtained in advance according to the schedule.

8. The apparatus of claim 7, the apparatus comprising:
the receiver further for receiving the radio-frequency signal directly from the antenna;
a synchronizer for synchronizing the prediction, which assembles the pre-recorded segments according to the schedule, with the radio-frequency signal received directly from the antenna; and
the correlator for determining the ambiguity function from both the prediction as synchronized by the synchronizer and the radio-frequency signal reflected from the object as received at the receiver.

9. An apparatus for passive coherent location, the apparatus comprising:
a forecaster for generating a prediction of a radio-frequency signal transmitted from an antenna of a broadcasting service;
an evaluator for generating an effectiveness metric from the prediction of the radio-frequency signal;
a receiver for receiving the radio-frequency signal that an object reflects from the antenna to the receiver, the receiver further for receiving the radio-frequency signal directly from the antenna;
a synchronizer for synchronizing the prediction, which assembles a plurality of pre-recorded segments obtained in advance from a playlist for the broadcasting service, with the radio-frequency signal received directly from the antenna; and
a correlator for determining, from the prediction as synchronized by the synchronizer and the radio-frequency signal reflected from the object as received at the receiver, an ambiguity function having a maximum at a temporal offset and a Doppler shift, wherein the temporal offset and the Doppler shift at the maximum partially determine at least a position of the object.

10. The apparatus of claim 9, wherein each of the pre-recorded segments in the playlist is selected from the group consisting of a musical composition, a commercial, a podcast, and a television program.

11. The apparatus of claim 1, the apparatus comprising:
the receiver further for receiving the radio-frequency signal directly from the antenna, the radio-frequency signal broadcasting a plurality of pre-recorded segments in a playlist for the broadcasting service; and
the forecaster further for generating an identifier of each current one of the pre-recorded segments broadcast in the radio-frequency signal that the receiver receives directly from the antenna, the forecaster for generating the prediction that assembles the pre-recorded segments each obtained from an entry in a library when the identifier indicates the current one of the pre-recorded segments is already available in the library for the broadcasting service, or otherwise obtained on-the-fly, with the entry in the library filled with the current one of the pre-recorded segments obtained on-the-fly so that the library evolves to encompass the playlist for the broadcasting service.

12. The apparatus of claim 11, wherein the forecaster is for generating the identifier that is a spectral signature of the current one of the pre-recorded segments broadcast in the radio-frequency signal that the receiver receives directly from the antenna.

13. The apparatus for the passive coherent location of claim 1, wherein:
in response to the broadcasting service publishing a schedule for the radio-frequency signal transmitted from the antenna, the forecaster is for generating the prediction that assembles a plurality of pre-recorded segments obtained in advance according to the schedule,
otherwise in response to the broadcasting service exhibiting a playlist for the radio-frequency signal transmitted from the antenna, the forecaster is for generating the prediction that assembles a plurality of pre-recorded segments from a library, which has a plurality of entries filled on-the-fly with the pre-recorded segments, so that the library evolves to encompass the playlist for the broadcasting service,
otherwise in response to the broadcasting service concurrently broadcasting a digital internet stream corresponding to the radio-frequency signal transmitted from the antenna, the forecaster is for generating the prediction from the digital internet stream,
otherwise, because the forecaster cannot generate the prediction of the radio-frequency signal transmitted from the antenna of the broadcasting service, the passive coherent location is suspended and active radar location is initiated.

14. The apparatus of claim 1, wherein the broadcasting service is a public or commercial broadcasting service of opportunity selected from the group consisting of a radio station and a television station.

15. The apparatus of claim 1, wherein evaluator is for generating the effectiveness metric determined from an autocorrelation of the prediction of the radio-frequency signal.

16. The apparatus of claim 1, wherein the evaluator is for generating the effectiveness metric that is assigned a null value during each time interval in which the forecaster cannot generate the prediction of the radio-frequency signal transmitted from the antenna of the broadcasting service.

17. The apparatus of claim 1, wherein:
the forecaster is for generating the prediction of a transmitted baseband signal from a modulation of a pre-recorded material obtained in advance, and the radio-frequency signal transmitted from the antenna is a frequency up conversion of the transmitted baseband signal;
the receiver is further for extracting a received baseband signal, which is a frequency down conversion of the radio-frequency signal that the object reflects from the antenna to the receiver; and
the correlator is for determining the ambiguity function from both the prediction of the transmitted baseband signal and the received baseband signal.

\* \* \* \* \*